US008066289B2

(12) United States Patent
Gross et al.

(10) Patent No.: US 8,066,289 B2
(45) Date of Patent: Nov. 29, 2011

(54) RAPID CLAMPING SYSTEM

(75) Inventors: Johann Gross, Heilbronn (DE); Helmut Seiler, Nordheim (DE)

(73) Assignee: Schunk Gmbh & Co. KG Spann-und Greiftechnik, Lauffen am Neckar (DE)

( * ) Notice: Subject to any disclaimer, the term of this patent is extended or adjusted under 35 U.S.C. 154(b) by 1104 days.

(21) Appl. No.: 11/886,748

(22) PCT Filed: Mar. 28, 2006

(86) PCT No.: PCT/EP2006/002796
§ 371 (c)(1),
(2), (4) Date: Sep. 20, 2007

(87) PCT Pub. No.: WO2006/103041
PCT Pub. Date: Oct. 5, 2006

(65) Prior Publication Data
US 2009/0079142 A1 Mar. 26, 2009

(30) Foreign Application Priority Data
Mar. 31, 2005 (EP) .................................... 05007129

(51) Int. Cl.
*B23B 31/177* (2006.01)
(52) U.S. Cl. ...................................... 279/4.12; 279/121
(58) Field of Classification Search .................. 279/4.1, 279/4.12, 4.11, 4.04, 4.06, 57, 66, 74, 121, 279/123
See application file for complete search history.

(56) References Cited

U.S. PATENT DOCUMENTS

| 1,181,844 | A | * | 5/1916 | Church | 279/121 |
| 4,647,051 | A | * | 3/1987 | Stone et al. | 279/2.04 |
| 4,913,481 | A | * | 4/1990 | Chin et al. | 294/207 |
| 5,961,261 | A | * | 10/1999 | Stark | 409/219 |
| 6,837,499 | B2 | * | 1/2005 | Rohm et al. | 279/106 |

FOREIGN PATENT DOCUMENTS

| DE | 202004009283 | 8/2004 |
| DE | 103 17 336 | 11/2004 |
| WO | 03/047812 | 6/2003 |

* cited by examiner

*Primary Examiner* — Daniel Howell
*Assistant Examiner* — Paul M Janeski
(74) *Attorney, Agent, or Firm* — Paul Vincent

(57) ABSTRACT

The invention relates to a rapid clamping system (50), comprising a clamping housing (12), with a piston (18) acted on from one side by springs (15) and which may be pressurised from the other side, with an actuator (60) arranged on the piston (18) to follow the piston movement, with at least one clamping bolt (32) arranged to be displaced perpendicular to the piston axis (28), in a working coupling acting in both directions of displacement with the actuator (60) by means of an inclined guide (52), whereby, with the springs (16) extended, the clamping bolt (32) takes up a locking position for locking a clamping pin (14) which may be introduced in the clamping housing (12) and which adopts an unlocking position for removal of the clamping pin (14) on corresponding pressurization of the piston (18). The invention is characterized in that the inclined guide (52) has an irregular guide contour (54) with varying angles of inclination ($\alpha$, $\beta$, $\gamma$, $\delta$) relative to the piston axis (28) to achieve varying translation ratios.

10 Claims, 3 Drawing Sheets

RAPID CLAMPING SYSTEM

This application is the national stage of PCT/EP2006/002796 filed on Mar. 28, 2006 and also claims Paris Convention priority of EP 05 007 129.9 filed on Mar. 31, 2005.

BACKGROUND OF THE INVENTION

The invention concerns a rapid clamping system with a clamping receptacle, comprising a piston which is loaded from one side by springs and may be pressurized from the other side, an actuator arranged on the piston to follow the piston movement, at least one clamping bolt arranged to be displaced, in particular, at least substantially perpendicular to the piston axis and motionally coupled to the actuator in both directions of motion via an inclined guide on the clamping bolt side, wherein, with the springs extended, the clamping bolt assumes a locking position for locking a clamping pin which may be introduced in the clamping receptacle and which adopts an unlocking position for removal of the clamping pin when the piston is pressurized.

The Assignee distributes rapid clamping systems of this type with the designation "SCHUNK UNILOCK". FIG. 1 shows a conventional rapid clamping system of this type, designated with reference numeral 10. The rapid clamping system has a clamping receptacle 12 comprising a clamping pin 14. Moreover, a piston 18 is provided which can be loaded on one side by springs 16, wherein the piston comprises rigidly disposed actuators 20 in the form of guiding pins, which are disposed at an inclination. The piston 18 is held in its upper end position (shown in FIG. 1) by the spring elements 16 and is loaded in the direction of the arrow 26. The springs 16 are thereby supported on a tension bolt 24 screwed into the basic housing 22. The housing 22 comprises clamping bolts 32 which are guided perpendicularly to the piston axis 28 along the axis 30, having an elongated shape in the direction of their respective axis 30. The clamping bolts 32 also have an inclined guide 34 into which the respective actuator 20 is immersed with positive fit.

The partial section of FIG. 1 shows only one clamping bolt 32 and one spring element 16. The cylindrical housing 22 comprises a total of two diametrically disposed clamping bolts 32 and, in particular, eight symmetrically distributed springs 16.

FIG. 1 shows the locking position of the rapid clamping system 10, wherein the springs 16 are deflected and the piston is in its upper end position, whereby the clamping bolts 32 are in their radially inner locking position via the actuators 20 and the inclined guides 34. In this locking position, the clamping pin 14 with circumferential groove 36 is held in the clamping receptacle 12 via locking projections 38 which are disposed on the radial inner side of the clamping bolts 32.

For removing the clamping pin 14 from the clamping receptacle 12, the pressure chamber 40, located between the basic housing 22 and the piston 18, is pressurized in a downward direction against the spring force of the springs 16 in the direction of arrow 42. Due to the actuators 20 which are rigidly disposed on the piston 18 and engage in the inclined guides 34, the clamping bolts 32 are moved in a radial outward direction into their unlocking position. The clamping pin 14 is thereby released and can be removed from the clamping receptacle.

It is advantageous to provide clamping bolts which are guided in the radial direction in that the clamping pin can be held in the clamping receptacle even under high loads, in particular, high tilting moments. The clamping pin can be released from the clamping receptacle only when forces act in a radial direction on the clamping bolt. In prior art, the force that keeps the clamping bolts in a radial direction in their locking position depends on the spring force of the springs to be provided. Depending on the spring constant of the springs to be used, this force may vary. If a high force is required, the springs must have a corresponding stiffness. This is disadvantageous in that, for opening the rapid clamping system, a correspondingly high pressure must be provided in the pressure chamber 40.

There are further conventional rapid clamping systems, which utilize clamping balls instead of clamping bolts. DE 103 17 336 A1 discloses, for example, such a rapid clamping system. However, the use of balls is problematic, since it is not possible to transfer high tilting moments of the clamping pin in the clamping receptacle. Due to the spherical surface of the balls, these tend not to prevent an undesired deflection of the clamping pin out of the clamping receptacle. The conventional clamping bolts of the applicant transmit higher tilting moments.

There are also conventional rapid clamping systems with which the clamping elements are moved in an axial and radial direction for locking the clamping pin in the clamping receptacle. DE 20 2004 009 283 U1 discloses one example thereof.

It is the underlying purpose of the present invention to advantageously further develop a rapid clamping system as described above, which transmits high tilting moments due to the clamping bolts that are guided to be displaceable in an axial direction. In particular, the locking forces that act in the radial direction via the clamping bolts shall be optimized.

SUMMARY OF THE INVENTION

This object is achieved by the above-mentioned rapid clamping system in that the inclined guide has an irregular guide contour with different angles of inclination relative to the piston axis to obtain different transmission ratios. The inventive rapid clamping system consequently differs from the prior art of FIG. 1 in that the actuator and the inclined guide do not provide a linear transmission ratio, but an optimized transmission ratio due to the irregular guide contour in order to maximize the clamping force in the locking position.

It must thereby be taken into consideration that, due to their extension, the springs to be used to load the piston on one side regularly provide a smaller force in their locking position than in the unlocking position in which the springs are pretensioned to a larger degree. This path-dependent spring force of the springs results, in particular, from the relatively short length of the springs. The inventive rapid clamping system can e.g. compensate for the path-dependent spring force of the springs to be used, such that the clamping force can be optimized, in particular, in the locking position. Depending on the angle of inclination of the guide contour to be provided, the transmission ratio of the motion of the actuator can be varied to move the clamping bolt. However, high tilting moments can be transmitted due to provision of the clamping bolt.

In one advantageous embodiment of the invention, the guide contour has two opposite crank sections, wherein the actuator runs along one crank section when the clamping bolt is displaced in one direction, and runs along the other crank section when the clamping bolt is displaced in the other direction. This is advantageous in that a forced guidance of the clamping bolt is ensured both during motion into the locking position and into the unlocking position.

The two crank sections may thereby, in particular, be differently designed and not be parallel to each other. In consequence thereof, the transmission ratio during displacement of the clamping bolt into the locking position may be different than in the unlocking position. In particular, during unlocking of the clamping bolt, the higher frictional forces of the locked system, which is at rest, must consistently be overcome. For this reason, unlocking initially requires higher forces, which can be provided by a correspondingly flat angle of inclination.

The guide contour or the crank sections may advantageously comprise subsections in the form of rapid stroke sections with larger angles of inclination and/or power stroke sections with smaller angles of inclination. The angles of inclination can be selected in correspondence with the properties of the stroke positions of the cam slide. The individual subsections of the crank sections can thereby verge into each other, preferably tangentially.

The rapid stroke sections thereby advantageously have an angle of inclination in a range between 30° and 60° and, in particular, in a range between 40° and 50° and/or the power stroke sections have an angle of inclination in a range from more than 0° to 30° and, in particular, in a range between 15° and 25°. With rapid stroke sections of 40° to 50° it has turned out that a sufficient amount of force can be provided for moving the adjusting slide, thereby correspondingly increasing the velocity of the adjusting slide. For angles of inclination in a range between 15 and 25°, it has turned out that, in particular with decreasing spring force, the force can be correspondingly increased to a sufficient extent.

With particular advantage, the guide contour is matched to the characteristics of the springs in such a fashion that the angles of inclination are smaller when the spring force decreases, as mentioned above.

With particular advantage, the guide contour is designed in such a fashion that upon, just before, and/or just after reaching the locking end position of the actuator, a power stroke section is provided. As mentioned above, the springs are extended in the end position and have a smaller spring force.

In another advantageous fashion, a rapid stroke section is provided upon, just before and/or just after reaching the unlocking end position of the actuator. The springs are thereby compressed and thus provide a comparatively large force. Moreover, there are no external forces against which the adjusting slide must act.

In accordance with the invention, the inclined guide may be designed as an inclined guide groove which extends transversely to the axis of motion of the clamping bolt, wherein the guide contour or the crank sections are formed by the opposite groove walls. In this respect, the actuator may be designed as a cylinder pin which is disposed on the piston and extends transversely to the axis of motion of the clamping bolt. The cylinder pin thereby advantageously has the same width or is wider than the guide groove, such that the forces can be transmitted over a large area.

BRIEF DESCRIPTION OF THE DRAWING

Further advantageous embodiments and details of the invention can be extracted from the following description which describes the invention in more detail with reference to the embodiment shown in the drawing.

FIG. 4b shows an intermediate position of the clamping bolt in accordance with FIG. 4a;

DESCRIPTION OF THE PREFERRED EMBODIMENT

Figure 1:
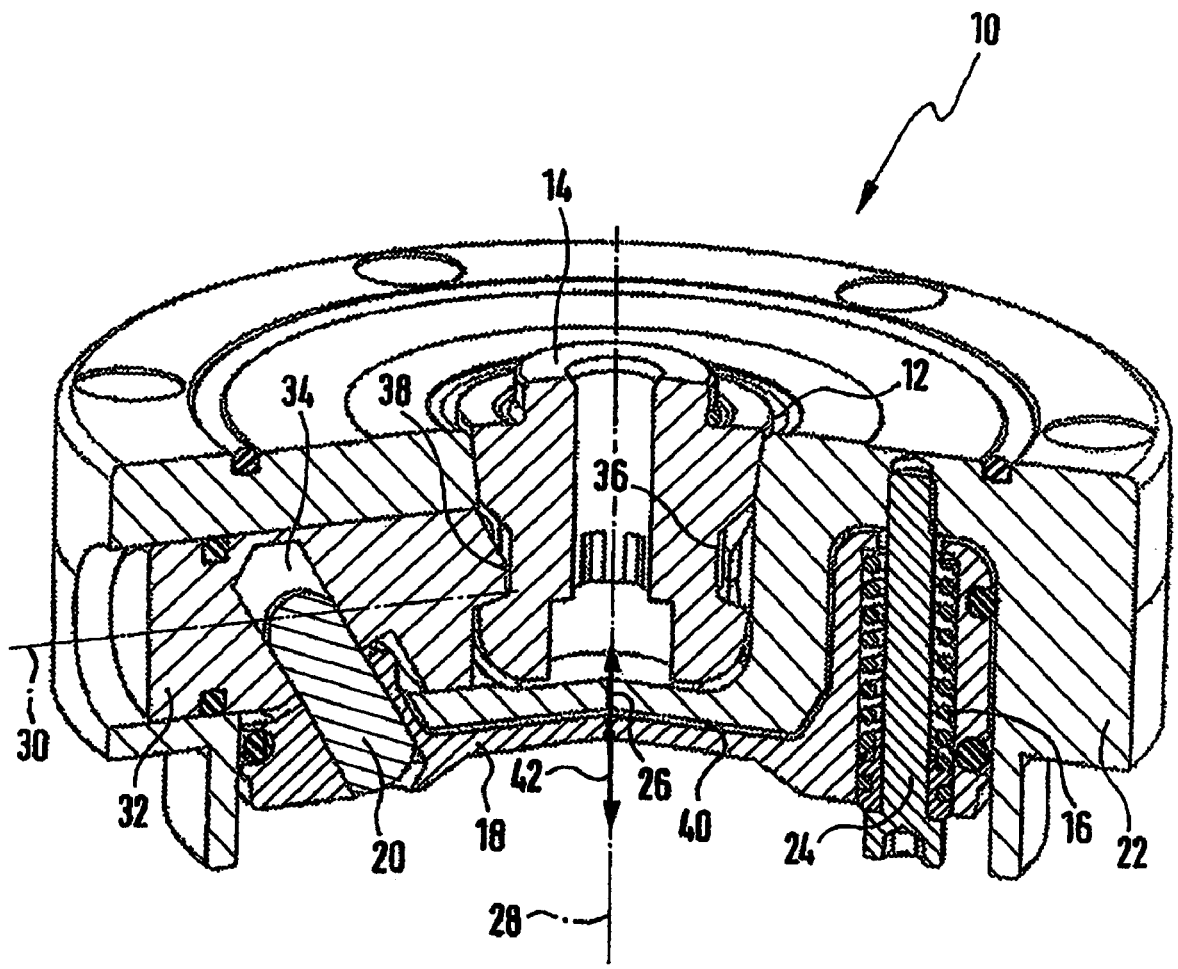
FIG. 1 shows the prior art as described above.

The construction of the inventive rapid clamping system 50 shown in the figures corresponds substantially to the rapid locking system 10 of FIG. 1. The corresponding components therefore have corresponding reference numerals.

Substantial differences between the inventive rapid clamping system 50 and the conventional rapid clamping system 10 are the design of the inclined guide and of the actuators. In the inventive rapid clamping system 50, the inclined guides 52 provided on the clamping bolts 32 have an irregular guide contour 54 with different angles of inclination relative to the piston axis 28 to obtain different transmission ratios. The respective guide contour 54 provides two opposite crank sections 56 and 58 which do not extend parallel to each other, wherein the actuators, which are designed as cylinder pins 60 which are rigidly disposed on the pistons 18, move along the crank sections 54 to reach the locking position, and move along the crank sections 56 to reach the unlocking position. The guide grooves are thereby designed as inclined guide grooves which extend transversely to the axis of motion 30 of the clamping bolt (FIGS. 2 and 3), wherein the crank sections 56 and 58 are formed by the opposite groove walls.

Figure 2:
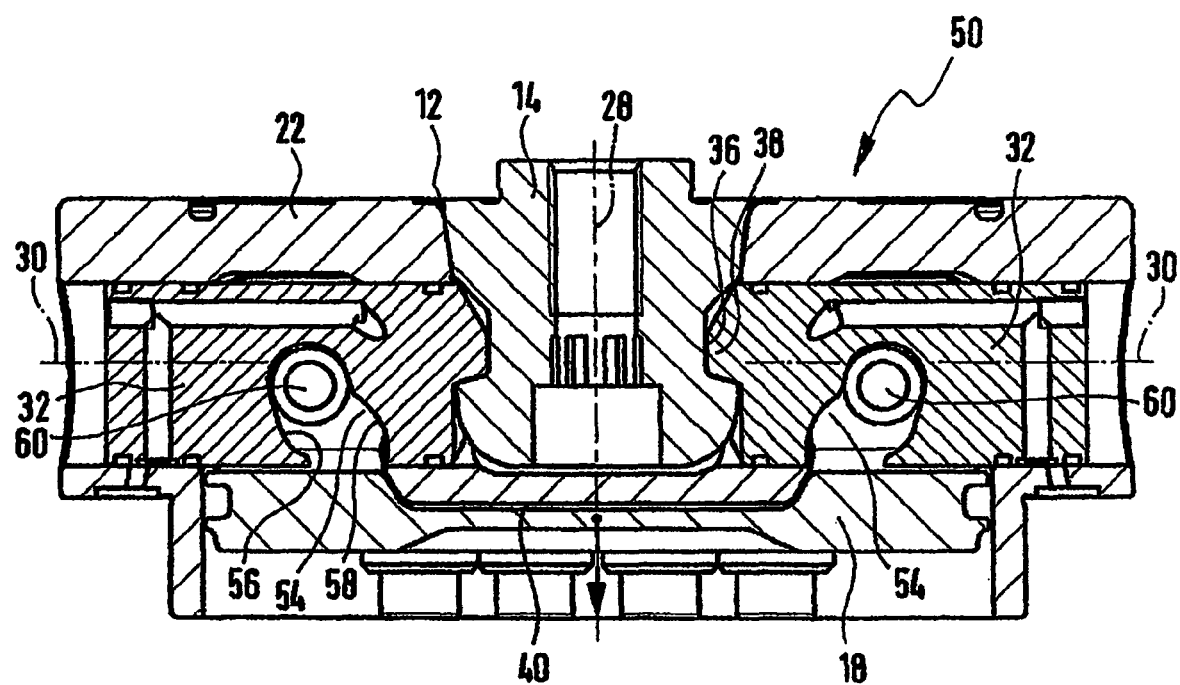
FIG. 2 shows a longitudinal section through an inventive locking means in the locking position.
Figure 3:
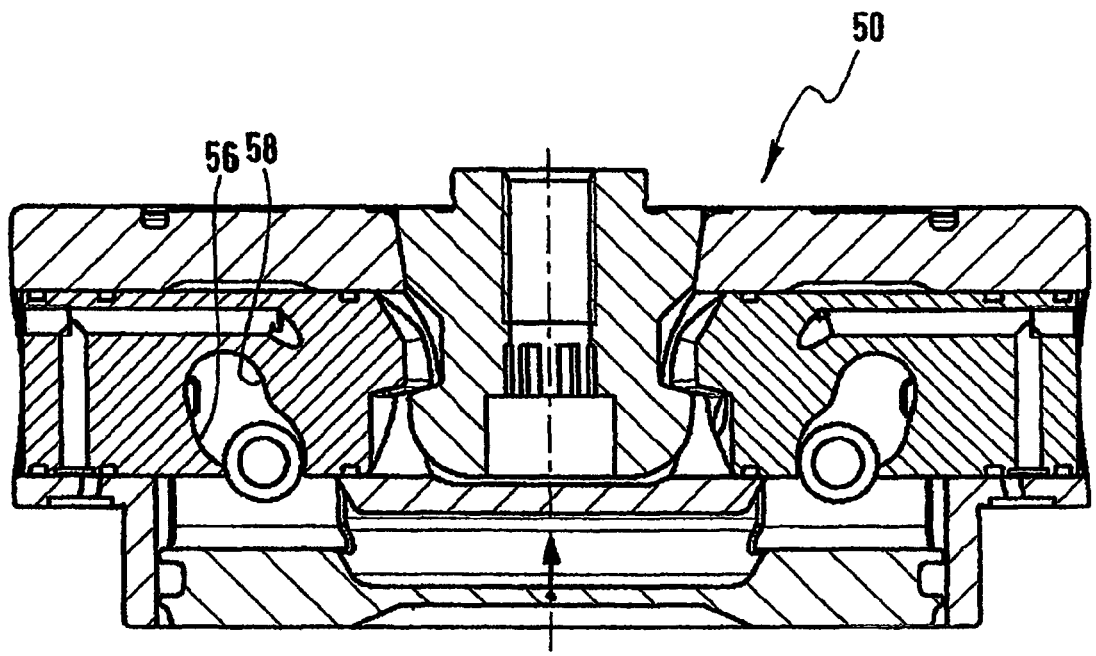
FIG. 3 shows the section of FIG. 2 in the unlocking position.

The spring elements, represented in FIG. 1, which hold the clamping bolts 32 in their locking position, are not shown in FIGS. 2 and 3.

FIG. 2 shows the locking position in which the clamping bolts 32 are held in their locking position due to the spring elements (not shown).

FIG. 3 shows the unlocking position, wherein the pressure chamber 40 is loaded with fluid in such a fashion that the spring elements (not shown) are compressed, the piston moves into its lower unlocking position and the actuators in the form of cylinder pins 60 are moved downwards. Due to the forced motional coupling of the cylinder pins 60 that engage in the inclined guides 52, the clamping bolts 32 move in a radially outward direction, thereby releasing the clamping pin 14.

FIG. 4 shows different intermediate positions of the clamping bolt 32 shown on the left-hand side of FIGS. 2 and 3.

Figure 4A:
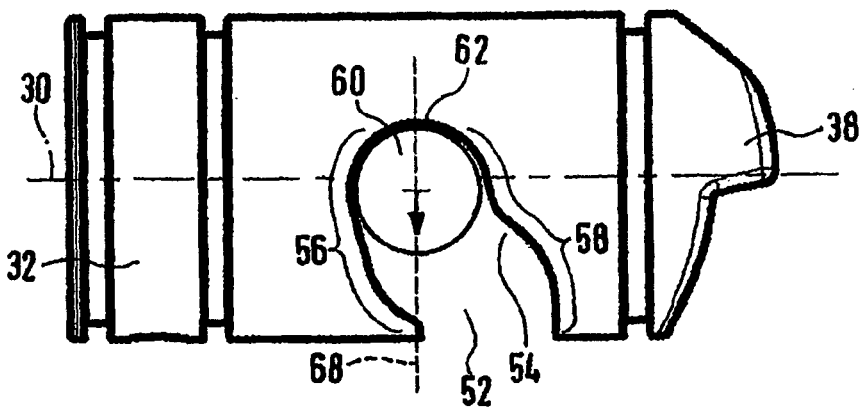
FIG. 4a shows a clamping bolt in the locking position.

FIG. 4a shows the locking position of FIG. 2. The cylinder pin 60 is thereby in its upper stroke end position and abuts the upper circular segment-shaped end 62 of the guide contour 54 of the inclined guide 52. As is shown in Figs. a through d, the two opposite crank sections 56 and 58 have a different design and are not parallel to each other.

During displacement of the piston 18 in the direction of the unlocking position, the cylinder pin 60 is moved in an axial downward direction and runs on the crank section 56. The crank section 56 has two sub-sections 64 and 66, wherein the sub-section 64 is designed as a power stroke section and the sub-section 66 as a rapid stroke section. The power stroke section 64 has a relatively small angle of inclination α of approximately 20° relative to the piston axis 28 or the axis of motion of the cylinder pin 60, which is characterized in FIGS. 4a through 4d with reference numeral 68.

Figure 4B:
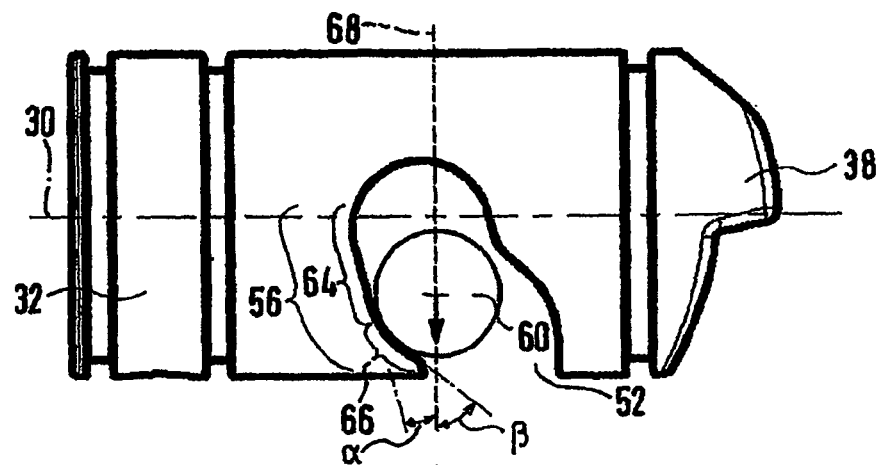

A tangential transition area between the power stroke section 64 and the rapid stroke section 66 is provided in the area which shows the cylinder pin 60 in FIG. 4b. The rapid stroke section 66 has an angle of inclination β of approximately 50° relative to the axis 68. Due to the power stroke section 64, high forces are initially provided during the return motion of the clamping bolt 32 from its locking position. This is required, in particular, when the clamping pin is under the influence of external tension forces, therefore requiring higher forces for returning the clamping bolt. As soon as the clamping bolt has been released from the clamping pin, the clamping bolt can be moved back using a relatively small force and relatively fast, which is ensured due to the large angle of inclination β of the rapid stroke section 66.

Figure 4C:
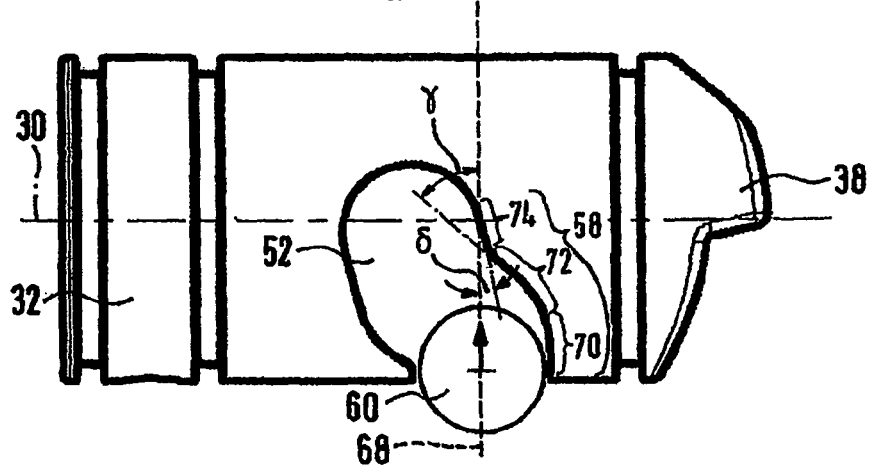
FIG. 4c shows the unlocking position of the clamping bolt.

FIG. 4c shows the cylinder pin 60 in its lower end position. The clamping bolt 32 is in its unlocking position.

For locking, the pressure chamber 40 is switched to a pressure-less state, thereby moving the piston 18 upwards due to the spring load. The cylinder pin 60 thereby moves along the crank section 58. The crank section 58 has substantially three partial sections, namely one short power section 70, one longer rapid stroke section 72 and one adjacent short power section 74.

Due to the first short power stroke section 70, the cylinder section 60 is moved upwards with an increased force towards the locking position. The rapid stroke section 72 tangentially joins thereto, which has an angle of inclination γ of approximately 45° relative to the axis 68. The power stroke section 74, which tangentially joins the rapid stroke section 72, is provided just before the locking end position is reached. Due to the power stroke section 74, the clamping pin 14 is locked with an increased locking force. This may be reasonable, in particular, when the springs 16 lose their spring force in the extended state. The decreasing spring force is consequently compensated for by the power stroke section 74 or moreover even increased. The power stroke section 74 has an angle of inclination δ of approximately 10° relative to the axis 28 or 68.

Figure 4D:
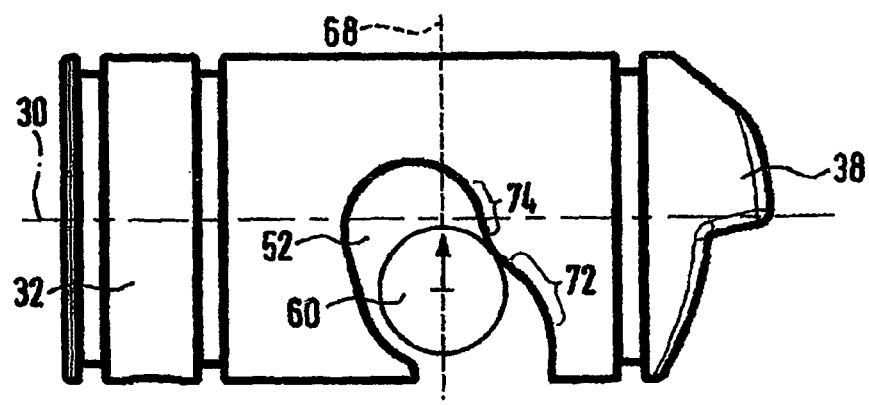
FIG. 4d shows an intermediate position of the clamping bolt.

The cylinder pin of FIG. 4d is in the tangential transition area between the rapid stroke section 72 and the power stroke section 74.

As is illustrated, in particular, in FIGS. 4a through 4d, the guide contour 54 has an irregular design due to the different crank sections 56 and 58, which produces particularly advantageous transmission ratios between the axial motion of the cylinder pin 60 and the radial motion of the respective clamping bolt 32.

We claim:

1. A rapid clamping system comprising:
   means defining a clamping receptacle;
   a clamping pin disposed in said clamping receptacle;
   a piston, structured and disposed for pressurizing at a first side thereof;
   a spring member for loading a second side of said piston;
   an actuator disposed on said piston to follow a piston motion; and
   at least one clamping bolt disposed for displaceable guidance and motional coupling to said actuator in two directions of motion via an inclined guide defined by said clamping bolt, said inclined guide having an irregular guide contour with differing angles of inclination relative to a piston axis to obtain differing transmission ratios, wherein, when said spring member is extended, said clamping bolt assumes a locking position for locking said clamping pin and when said piston is loaded with an appropriate pressure, said clamping bolt assumes an unlocking position for removing said clamping pin, said guide contour having two opposite crank sections, with said actuator running along a first crank section when said clamping bolt is moved in one direction and running along a second crank section when said clamping bolt is moved in an other direction, wherein said two crank sections have different designs and are not parallel to each other.

2. The rapid clamping system of claim 1, wherein said guide contour has rapid stroke sections with larger angles of inclination and/or power stroke sections with smaller angles of inclination.

3. The rapid clamping system of claim 2, wherein said rapid stroke sections have angles of inclination in a range between 30° and 60° and/or said power stroke sections have angles of inclination in a range from more than 0° to 30°.

4. The rapid clamping system of claim 1, wherein said guide contour is matched to characteristics of said spring member such that smaller angles of inclination are provided when a spring force decreases.

5. The rapid clamping system of claim 2, wherein said power stroke section is disposed just before and/or just after reaching a locking end position of said actuator.

6. The rapid clamping system of claim 2, wherein said rapid stroke section is disposed just before and/or shortly after reaching an unlocking end position of said actuator.

7. The rapid clamping system of claim 1, wherein said inclined guide is designed as an inclined guide groove which extends transversely to an axis of motion of said clamping bolt, said guide contour being formed by opposite groove walls.

8. The rapid clamping system of claim 1, wherein said the actuator is designed as a cylinder pin which is disposed on said piston and extends transversely to an axis of motion of said clamping bolt.

9. The rapid clamping system of claim 3, wherein said rapid stroke sections have angles of inclination in a range between 40° and 50°.

10. The rapid clamping system of claim 3, wherein said power stroke sections have angles of inclination in a range between 15° and 25°.

* * * * *